July 21, 1964  D. B. LESTER  3,141,333
DEPTH MEASURING APPARATUS
Filed Dec. 17, 1962
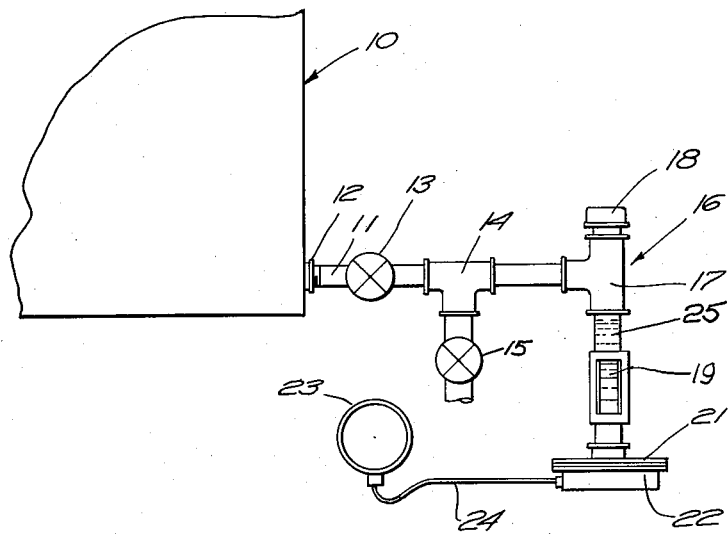

United States Patent Office 3,141,333
Patented July 21, 1964

3,141,333
DEPTH MEASURING APPARATUS
David B. Lester, Cambridge, Mass., assignor to W. R. Grace & Co., Cambridge, Mass., a corporation of Connecticut
Filed Dec. 17, 1962, Ser. No. 244,994
4 Claims. (Cl. 73—299)

This invention relates to a method of measuring the depth of liquid in tanks and is particularly concerned with with measuring liquid depths in tanks of fluid capable of forming a coagulum.

The depth of liquids in tanks is frequently measured by pressure transmitters which essentially depends upon the distortion of a diaphragm placed in or near the bottom of the tank where substantially the full pressure of the column of liquid in the tank can be exerted on the diaphragm and be transmitted to a recording instrument located at a considerable distance. These diaphragms work very well with pure fluids. They do not work well if the fluid contains suspensoids which settle, and are particularly troublesome if the suspensoids can form a coagulum which sinks. In the latter case, the coagulum coats the transmitter diaphragm, changes its pressure response, and causes a progressively increasing error in the depth recordings. Consequently, if an accurate measure of tank contents is to be maintained, frequent transmitter cleanings are necessary. Transmitter cleaning is expensive and highly inconvenient. Even with the frequent transmitter cleaning employed in the past, the measuring device is then only accurate for a matter of hours as opposed to a matter of months of accurate readings when employing the device of this invention.

I have discovered a method of installing a depth recorder in a tank which permits the recorder to maintain a high degree of accuracy for such longer times than heretofore were possible. Specifically, tanks which have required cleaning at very short intervals because of the inaccuracy of the liquid depth measuring devices, have operated from six to eight months with no inaccuracy, when equipped in accordance with my improved method.

The invention may best be understood by reference to the drawing in which the single figure diagrammatically illustrates the piping and fluid arrangement by which these results may be accomplished.

Referring to the figure, the tank 10 is shown in breakaway. A pipe 11 is attached to the tank nozzle 12. The bore of the pipe communicates with the interior of the tank 10. Main control valve 13 is inserted in the pipe 11 and following this, a T 14 is inserted the branch opening of which is equipped with a sampling and draw-off cock 15.

Pipe 11 terminates in a vertical leg 16 which comprises a T 17, the upper end of which is plugged at 18. A sight glass 19 is inserted slightly below the T. The bottom end of the sight glass connection is led through the flange 21 to the pressure chamber of the pressure transmitter 22 from which the pressure reading is transmitted to the recorder 23 through the connection—either hydraulic or electric—24.

Before the tank is filled with fluid, the vertical leg above the pressure transmitter is filled to a level just below the T 17 with a sealing fluid 25 which has a substantially higher density than that of the material in the tank. Consequently as the tank fills, the hydraulic pressure developed by the height of the column of liquid in the tank is exerted on a liquid piston (the fluid 25) which occupies a portion of the bore of vertical leg 16. Due to the density difference, the fluids do not mix. As a consequence of this arrangement, no coagulum builds up on the flexible diaphragm and the pressure indications which are transmitted from beneath the diaphragm of the pressure transmitter remain accurate.

Insolubility or immiscibility of the fluid 25 with the suspending medium in the tank 10 although desirable is not necessary. Density difference alone will isolate the tank coagulum from the diaphragm for a satisfactorily long time. Once the apparatus is calibrated, recalibration after cleaning is unnecessary provided the new change of fluid 25 possesses identical density.

The function of the sight glass 19 is primarily to give an indication as to when this apparatus requires cleaning. When the sight glass becomes plugged or opaque from coagulum, cleaning is necessary. This may be done very simply by closing the valve 13 which shuts off the flow from the tank, removing the plug 18 and swabbing out or otherwise cleaning the vertical leg. After cleaning, the leg is refilled with high density fluid to the desired level.

It is obvious that the fluid used as the liquid piston must be chosen with due regard to the contents of the tank. As an example, if the tank contents be polyvinyl acetate emulsion, an effective liquid piston is glycerine, the density of which, 1.260, is considerably greater than that of the polyvinyl acetate emulsion. Experience has shown that in the case of polyvinyl acetate emulsions, cleaning and flush-out times may be reduced in the ratio of from approximately 20 to one or two times a year when this arrangement is used, with cleaning time being only a matter of minutes.

What is claimed is:
1. The method of preventing the formation of coagulable precipitates on the diaphragms of diaphragm-operated tank depth recorders, and thereby maintaining the accuracy of such recorders which includes interposing between the diaphragm of the recorder and the liquid in the tank a column of liquid having a density significantly higher than that of the tank contents and providing a passage connecting the top of said liquid column with the liquid contents of the tank whereby head pressure representing the height of liquid in said tank is imposed on said higher density liquid column.

2. The method as defined in claim 1 wherein said liquid in the tank is polyvinyl acetate emulsion and said liquid column is glycerine.

3. In association with a tank having diaphragm-operated means to indicate the depth of liquid in said tank, means to prevent a coagulable precipitate from said liquid from forming on said diaphragm and thereby impairing its accuracy which includes a column of liquid having a density higher than that of the contents of said tank, in contact with said diaphragm and interposed between said diaphragm and the liquid contents of the tank, whereby head pressure representing the height of liquid in said tank is imposed on said higher density liquid column, the contact of the coagulum with the diaphragm is prevented.

4. In a tank having diaphragm-operated means to indicate the depth of polyvinyl acetate emulsion in said tank, the improvement for preventing a coagulable precipitate from said polyvinyl acetate emulsion from forming on said diaphragm and impairing its accuracy, which comprises a column of glycerine in contact with said diaphragm and interposed between said diaphragm and the polyvinyl acetate emulsion, whereby head pressure representing the height of polyvinyl acetate in said tank is imposed upon said glycerine column and the contact of the coagulum with the diaphragm is prevented.

No references cited.